(12) United States Patent
Codio et al.

(10) Patent No.: US 12,067,145 B2
(45) Date of Patent: Aug. 20, 2024

(54) CONSENT DATA PIPELINE ARCHITECTURE AND OPERATION

(71) Applicant: Microsoft Technology Licensing, LLC, Redmond, WA (US)

(72) Inventors: Smith Codio, Sammamish, WA (US); Anubhav Tandon, Snoqualmie, WA (US); Patrick Meade Stirrat, Kirkland, WA (US); Mukesh Pohuja, Redmond, WA (US); Gyan Prakash Trivedi, Sammamish, WA (US); John Michael Bolinder, Redmond, WA (US); Rohit Sanka, Redmond, WA (US); Rong Zhou, Bothell, WA (US); Balasubramanian Shyamsundar, Redmond, WA (US); Harsha Bacharaju, Duvall, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 299 days.

(21) Appl. No.: 17/548,474

(22) Filed: Dec. 10, 2021

(65) Prior Publication Data

US 2023/0081166 A1 Mar. 16, 2023

Related U.S. Application Data

(60) Provisional application No. 63/243,692, filed on Sep. 13, 2021.

(51) Int. Cl.
*G06F 21/00* (2013.01)
*G06F 16/14* (2019.01)
(Continued)

(52) U.S. Cl.
CPC ........ *G06F 21/6245* (2013.01); *G06F 16/156* (2019.01); *G06F 16/164* (2019.01)

(58) Field of Classification Search
None
See application file for complete search history.

(56) References Cited

U.S. PATENT DOCUMENTS

| 10,505,737 B1 | 12/2019 | Xu et al. |
| 2019/0188312 A1* | 6/2019 | Pandit ................. G06F 21/6245 |
| 2020/0004987 A1* | 1/2020 | Brannon ............... G06F 16/958 |

FOREIGN PATENT DOCUMENTS

| WO | 2020223735 A1 | 11/2020 |
| WO | WO-2020223735 A1 * | 11/2020 ........... G06F 21/604 |

OTHER PUBLICATIONS

"International Search Report and Written Opinion Issued in PCT Application No. PCT/US22/037953", Mailed Date: Oct. 12, 2022, 10 Pages.

(Continued)

*Primary Examiner* — Andrew J Steinle
(74) *Attorney, Agent, or Firm* — Barta Jones, PLLC

(57) ABSTRACT

The disclosure herein describes processing consent data and using the processed consent data in workflows. Customer consent data is accessed, wherein the customer consent data includes subject consent instances including associated consent purpose-value pairs. The customer consent data is mapped to a raw consent data schema based on mapping selections made on a mapping UI, wherein the mapping includes mapping consent purpose-value pairs of the consent instances to data columns of the raw consent data schema. Metadata representing one or more consent rules related to the raw consent data schema is generated based on rule selections made on a rule configuration UI and the consent rules are applied to one or more workflows. The disclosure enables consent data in different formats and/or from different sources to be ingested and standardized in a single platform such that consent checking functionality can be (Continued)

provided for applications in a consistent and comprehensive manner.

20 Claims, 10 Drawing Sheets

(51) Int. Cl.
  *G06F 16/16* (2019.01)
  *G06F 21/62* (2013.01)

(56) References Cited

OTHER PUBLICATIONS

"About consent mode (beta)", Retrieved from: https://web.archive.org/web/20210622143057/https://support.google.com/google-ads/answer/10000067?hl=en, Jun. 22, 2021, 2 Pages.
"Amperity", Retrieved from: https://web.archive.org/web/20211110105701/https://amperity.com/, Nov. 10, 2021, 9 Pages.
"Consent Management Platform (CMP) 2021 Tracker", Retrieved from: https://web.archive.org/web/20210117222455/https://www.kevel.co/cmp/, Jan. 17, 2021, 5 Pages.
"Gartner Predicts 80% of Marketers Will Abandon Personalization Efforts by 2025", Retrieved from: https://www.gartner.com/en/newsroom/press-releases/2019-12-02-gartner-predicts-80-of-marketers-will-abandon-person, Dec. 2, 2019, 2 Pages.
"Mparticle", Retrieved from: https://web.archive.org/web/20211114000212/https://www.mparticle.com/, Nov. 14, 2021, 8 Pages.
"OneTrust Consent & Preference Management", Retrieved from: https://web.archive.org/web/20210330031349/https://www.onetrust.com/solutions/consent-and-preferences/, Mar. 30, 2021, 8 Pages.
"Segment", Retrieved from: https://web.archive.org/web/20211114192100/https://segment.com/, Nov. 14, 2021, 9 Pages.
Herman, Scott, "Measure conversions while respecting user consent choices", Retrieved from: https://blog.google/products/marketingplatform/360/measure-conversions-while-respecting-user-consent-choices/, Sep. 3, 2020, 5 Pages.
Johnsen, Vegard, "Helping publishers manage consent with Funding Choices", Retrieved from: https://blog.google/products/admanager/helping-publishers-manage-consent-funding-choices/, Jul. 30, 2020, 4 Pages.
Omale, Gloria, "Top 5 Trends Drive Gartner Hype Cycle for Digital Marketing", Retrieved from: https://www.gartner.com/en/marketing/insights/articles/top-5-trends-drive-gartner-hype-cycle-digital-marketing-2020, Sep. 1, 2020, 4 Pages.
Pasquet, Thomas, "Mobile Advertising: The Shift From Data-Driven To Choice-First", Retrieved from: https://www.forbes.com/sites/forbestechcouncil/2019/10/31/mobile-advertising-the-shift-from-data-driven-to-choice-first/?sh=6175ee346ceb, Oct. 31, 2019, 5 Pages.
Vaughn, Stephanie, "Adobe Announces CDP Built for First-Party Data", Retrieved from: https://www.cmswire.com/digital-marketing/adobe-announces-cdp-built-for-first-party-data/, Apr. 30, 2021, 3 Pages.

\* cited by examiner

CONSENT DATA PIPELINE ARCHITECTURE AND OPERATION

CROSS-REFERENCE TO RELATED APPLICATION

This application claims the benefit of U.S. Provisional Patent Application Ser. No. 63/243,692 filed on Sep. 13, 2021 and entitled "CONSENT DATA PIPELINE AND ARCHITECTURE", which is hereby incorporated by reference in its entirety for all intents and purposes.

BACKGROUND

Businesses are required to capture and honor consent from customers when gathering data or telemetry about the customer. The essence of modern marketing is to collect customer data to better understand the customer and provide a unique experience that connects with them. Many countries are now requiring data collectors to get consent for how users' data is handled. Rapid evolutions of customer data control and privacy regulations such as General Data Protection Regulation (GDPR) and California Consumer Privacy Act (CCPA) has led to concerns around privacy management. Further, the consent information is often stored in a manner that is difficult to map to scenarios and actions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for processing consent data and using the processed consent data in workflows is described. Customer consent data is accessed, wherein the customer consent data includes subject consent instances including associated consent purpose-value pairs. The customer consent data is mapped to a raw consent data schema based on mapping selections made on a mapping user interface (UI), wherein the mapping includes mapping consent purpose-value pairs of the consent instances to data columns of the raw consent data schema. Metadata representing one or more consent rules related to the raw consent data schema are generated based on rule selections made on a rule configuration UI and the consent rules are applied to one or more workflows.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 10, the systems are illustrated as schematic drawings. The drawings may not be to scale.

DETAILED DESCRIPTION

Figure 1:
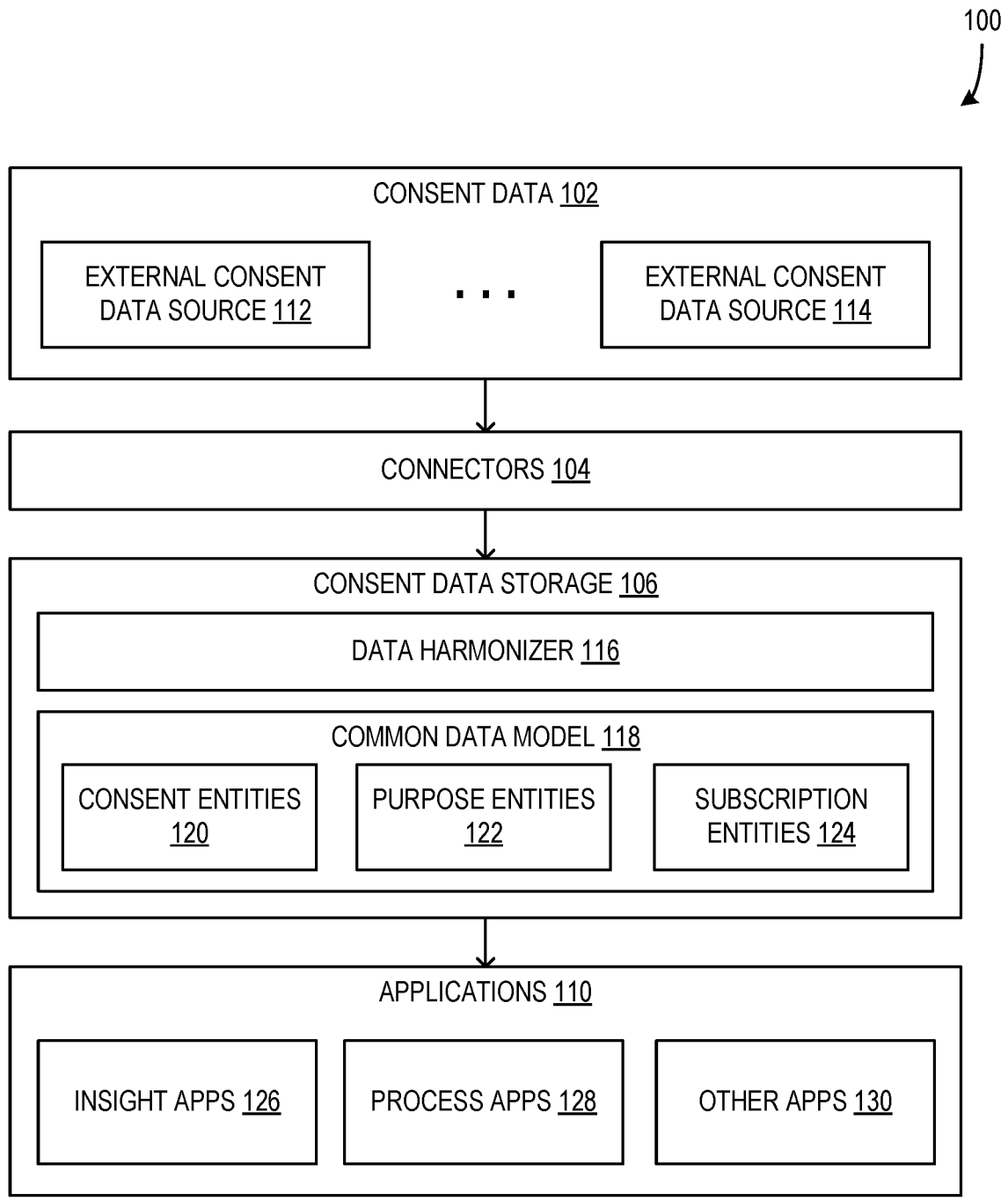
FIG. 1 is a block diagram illustrating a consent data pipeline system configured to collect consent data from multiple consent data sources, harmonize the consent data, and provide the harmonized consent data for use with applications.

Aspects of the disclosure describe an exemplary architecture and operation of a consent data pipeline, including example user interface (UI) components, backend services, and storage components. A first run experience (FRE) is also described that covers the initial instantiation and configuration of the consent data pipeline. In some examples, a consent management platform is deployed as a consent management feature in a customer insights (CI) framework.

The system described herein provides tools to honor trust with customers while being compliant with regulatory obligations. The system applies the semantics of the consent to whatever processing is done with the data. The system uses a no-code or low-code mapping interface and process between the original captured consent into a customer data platform (CDP) in such a way that natural "jobs to be done" in the customer data platform can correctly interpret the semantic meaning of the consent and apply it to actions such as segmentation and predictive model training and evaluation. In this manner, the system maps consent data into actions in data flows to ensure that actions in the data flows abide by the consent given by the customers. The system is a consent and preference management tool that empowers customers to manage how their data is shared and simplify the management of customer data through building a unified space of consented data from various outlets through which the organization or business are connecting with customers.

Aspects of the disclosure provide privacy, transparency, and control over collected customer data. The system includes a canonical consent data model with attributes to enable both producers and consumers of consent data to have a well-known location, shape, and semantic understanding of consent. The system also includes an interface for interoperability with third party or custom-made consent platforms, thereby allowing the third-party consent platforms to consume consent data exported from the system. The system is operable with consent data from a single source (e.g., capture application programming interfaces (APIs)) or aggregated and unified from multiple sources (e.g., commercial or proprietary systems). The consent controls described herein may be automatically applied (e.g., via global settings) or configurable in workflows selected by the user (e.g., individual business applications). The consent data is also refreshed automatically using the consent data pipeline. The system is operable in mixed permission environments, including consented and non-consented customers. The system further is capable of enforcing consent in artificial intelligence (AI) model training.

For example, marketers using the CDP described herein are able to honor customer consent without having to know where and how consent data is being captured or managed, all while not needing to create new workflows or business process changes. The system enables data harmonization of third party consent and privacy management platforms to support end-to-end consent validation.

In some examples, the system enables clarity around the audiences being reached and the channels through which those audiences are contactable. The system also drives insights on campaigns and site activity. The system also offers services that allow for consented data from health applications to be brought into the centralized data store. Further, marketing managers can create email campaigns to specific target users with consent in specific channels. The system extends trust-based personalization engagement without breaching consumer privacy.

Further in some examples, the system and operations described herein further enable customers (e.g., companies or other entities that consume the described consent management services) to track subject, consumer, and/or user consent and preferences in a centralized data store that has native integration with customer databases. Additionally, or alternatively, the disclosure enables marketing campaigns to be executed using segments that have been enriched and optimized, while honoring individual consent and communication preferences.

The disclosed system is applicable in various industries such as healthcare, financial services, manufacturing/automotive etc.

Example insights and intelligent actions enabled by the system include: compliance managers in an organization gaining insights from user consent states across multiple channels and tracking consent trends across subscriptions (opt-in/out), marketing managers in an organization creating campaigns that target users who have explicitly or implicitly provided their consents from multiple channels, and/or auditing trails of engagements and op-in/outs, consent collection points trends, top subscriptions, etc.

The system delivers seamless integration with databases of customer information to enable data wranglers to create segments based on an individual consent (customer profile) and preferences. This helps optimize segment curation and increase consumer loyalty. Further operations include: integrating with external consent data sources (e.g., the ability to harmonize consent data from multi data sources with same data use purpose based on rules), audience sizing (e.g., identifying the projected reach of a campaign to achieve business outcomes without breaching customer permissions), activation optimization (e.g., activating only contactable audience through export destinations to have optimal results from an activation service), and/or segmentation (e.g., quickly identifying the right customers who subscribed to receive communications for a marketing campaign and contact them on their preferred channels).

The system provides various advantages such as the following: providing support for data isolation and virtual private network (VPN), storing consent data on a dedicated cluster (e.g., required by some enterprise customers), providing the ability for consumer profiles to be associated with strong identities or local identities to ensure end-to-end tracking through the customer journey, and/or providing an extensibility approach that enables third party activation platform providers to use an API client software development kit (SDK) to create seamless integration for "last mile" consent verification scenarios where third party activation systems are able to confirm any changes in user consent.

In some examples, the underlying business process data is stored in a consistent, schematized form (e.g., common analytical model) with the ability to add or extend custom business entities. This enables data tagging and automates discovery and storage of data subject's data.

Aspects of the disclosure include a pipeline for bringing in captured consent from various providers. A centralized data store consumes data from across consent sources. From there, consent sources are harmonized into standard entities for application across business processes. As an example, FIG. 1 is a block diagram illustrating a consent data pipeline system 100 configured to collect consent data 102 from multiple consent data sources 112-114, harmonize the consent data, and provide the harmonized consent data (e.g., the data of the common data model 118) for use with applications 110. In some examples, the system 100 includes hardware, firmware, and/or software configured as a platform executed on a computing device or a plurality of computing devices connected via a network (e.g., a distributed network of devices or "cloud"). In such examples, the computing device or devices executing the platform are computing devices as described below with respect to FIG. 10.

In some examples, the system 100 receives, obtains, or otherwise gets consent data 102 from one or more external consent data sources 112-114. The consent data received by the system 100 is received via connectors 104. The external consent data of the sources 112-114 provide consent data that is of differing types, formats, and/or structures to the system 100, and the system 100 is configured to harmonize those differing data sets into consistent, standardized entities as described herein. Such external consent data sources 112 are configured to maintain consent data using an established consent data service (e.g., ONETRUST consent management framework), using more custom or proprietary methods and systems, or using other types of consent data storage methods and systems, without departing from the description. In some examples, the system 100 is configured to be compatible with many different types of external consent data sources 112-114 and the external consent data 102 associated therewith.

The connectors 104 include hardware, firmware, and/or software configured to operate as interfaces between the external consent data sources 112-114 and consent data storage 106 of the system 100. In some examples, the connectors 104 include a compatible connector for each type of external data source 112-114. Additionally, or alternatively, the connectors 104 include multiple redundant connectors of a type to ensure at least one is available and/or to enable multiple external consent data sources 112-114 of the same type to provide consent data to the system simultaneously. Further, in some examples, administrators of the system 100 and/or of an external consent data source 112-114 are enabled to generate new types of connectors 104 that are compatible with new types of external consent data sources 112-114 without departing from the description.

The consent data storage 106 of the system 100 includes hardware, firmware, and/or software configured to store large quantities of harmonized, consistent consent data as described herein. The consent data storage 106 includes a data harmonizer 116 and data entities of a common data model 118 (e.g., the harmonized consent data). The harmonization of the data into the standard entities 120, 122, and 124 of the common data model 118 are described in greater detail below with respect to FIGS. 2 and 3.

Additionally, or alternatively, in some examples, the consent data storage 106 is accomplished in one or more different formats. The consent data storage 106 securely stores and manages data used by business applications. Data within the consent data storage 106 is stored within a set of tables, in some examples. A table is a set of rows (formerly referred to as records) and columns (formerly referred to as fields/attributes). Each column in the table is designed to store a certain type of data, for example, name, age, salary, and so on. More, fewer, and/or different types of data are stored in the consent data storage 106 in other examples without departing from the description.

The consent data of the system 100 (e.g., the external consent data 102 and/or the consent data after being harmonized in the consent data storage 106) is configured to describe consent given or denied by subjects for purposes. In some examples, a subject is a user, customer, or other person that is asked for consent by an entity (e.g., an entity associated with an external consent data source 112-114). For instance, a user of a website provides some personal information to the website and is asked by the website for consent to use the personal information in some way, such as to use it to provide personalized recommendations to the user, to share it with other entities, and/or to use the personal information (e.g., an email address) to communicate with the user further.

In many examples, the consent data described herein is the data collected by websites or other entities that indicates to the entity what actions or processes the user has consented to and for which actions or processes the user has withheld consent. In some such examples, a consent data entity includes a subject ID identifying the subject being asked for consent, an indicator of the type of consent being asked for (e.g., the purpose or action for which the consent is being requested), an indicator identifying the entity asking for consent, and a data value indicating whether the subject gave consent or not. Additionally, or alternatively, such a consent data entity includes other data values, such as date and/or time data associated with the consent request and/or the subject's answer to the request, location data associated with the subject (e.g., different countries have different consent requirements so such data can be used by the requesting entity to determine legal requirements associated with the consent), data indicating the method or media used to request consent (e.g., an email, a phone call, a text, etc.), and/or other types of data. In other examples, more, fewer, or different types of data are used in a consent data entity without departing from the description.

Harmonized consent data in the consent data storage 106 is used by applications 110. In some examples, the applications 110 use the consent data in the consent data storage 106 to determine whether a subject's data can be used for a particular purpose. Additionally, or alternatively, the applications 110 use the consent data to determine whether a subject is part of a segment of subjects that the applications 110 are using to perform operations. In other examples, the consent data is used by the applications 110 for other purposes without departing from the description. Further, in some examples, applications 110 include insight apps 126 (e.g., applications that are configured to analyze subject data, including the consent data, to provide insights about various data points or patterns), process apps 128 (e.g., applications that are configured to process subject data in some way and that use the consent data in those processes and/or to determine whether a subject's data can or should be processed), and/or other apps 130 (e.g., artificial intelligence (AI)-based apps use the consent data to determine segments of subject data to use for training purposes). In other examples, more, fewer, or different types of applications 110 are configured to make use of the consent data of the consent data storage 106 without departing from the description.

In some examples, the system 100 is configured to perform operations associated with a first-time, manual data refresh from consent data sources 112-114, or based on a scheduled data refresh interval. For the first-time run, each data source refresh interval is saved in a global database (DB) container. In an example, every six hours the data ingestion pipeline (e.g., the connectors 104 and/or other elements of the system 100 configured to ingest the consent data) is triggered and starts data import processing (e.g., for those instances that need to be refreshed). Since the most frequent interval of data ingestion is once every six hours in this example, the system receives an indication of content ingestion as being complete by, for example, a process of the system polling for completion after the refresh starts.

During the initial "Import Data" configuration, the refresh interval is stored in the DB (global across all instances of the system 100). Further, the DB allows setup of triggers. Each instance of a refresh interval is stored in a DB container and each refresh interval is specific to an instance. After the post-processing is complete, the system 100 invokes the first-party data sharing API with the folder containing the model structure (e.g., a model.json file) and the corresponding data source name.

Figure 2:
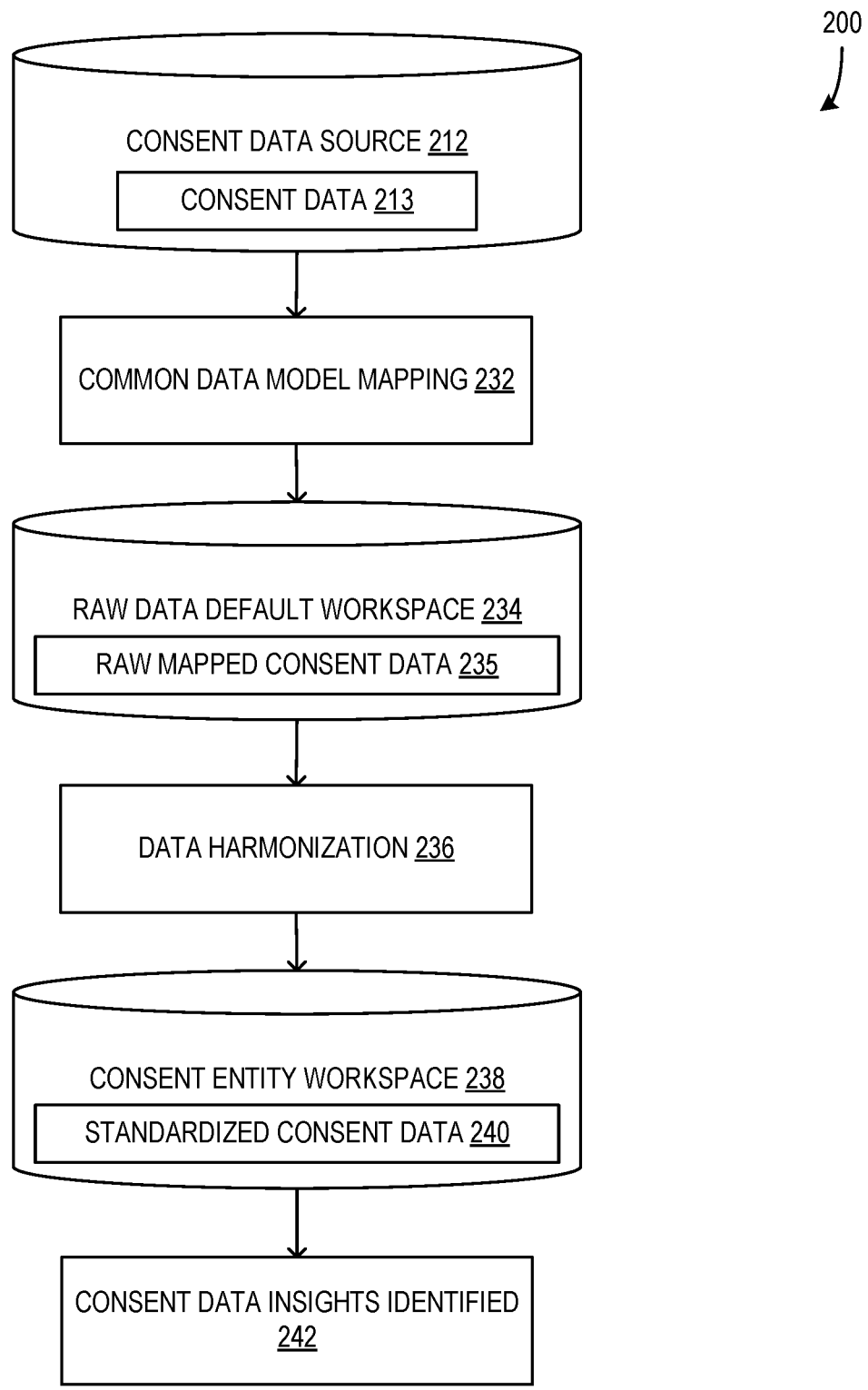
FIG. 2 is a block diagram illustrating a system process configured to map consent data from a consent data source to a consent entity workspace of standardized consent data.

FIG. 2 is a block diagram illustrating a system process 200 configured to map consent data 213 from a consent data source 212 to a consent entity workspace 238 of standardized consent data 240. In some examples, the system process 200 is executed or otherwise performed in a system such as system 100 of FIG. 1 described above.

In some examples, the consent data 213 of the consent data source 212 is formatted according to a comma separated value (CSV) format, an EXCEL format, or a structured query language (SQL) format. In other examples, the consent data 213 is formatted according to one or more other data formats without departing from the description.

Further, in some examples, the initiation of the process 200 is performed by a user such as an administrator user of the entity with which the consent data source 212 is associated. The user goes through a process to set up the mapping of the data fields and values (e.g., data columns in a database or data structure) of the consent data 213 to data fields and columns of the raw mapped consent data 235 in the raw data default workspace 234. This set up process is done for both new users of the pipeline system and existing users that are configuring a new consent data source 212.

Additionally, or alternatively, after completing an initial customer data import associated with the entity, the user is prompted to choose to honor their subjects' consent preferences. Based on the user selecting to do so, the process 200 is initiated as described herein. For instance, after the customer data import, the user is shown an advertising banner on the computer device UI, and clicking or otherwise activating the banner launches a UI associated with the pipeline system 100 and the described process 200.

In an example, the initial FRE process includes a connection between the FRE user experience (UX) frontend and the backend of the pipeline system. Based on a request from the frontend including a current UI identifier, a pipeline instance identifier is provided in response. The backend is configured to store the workspace information and pipeline instance information in a global configuration in a database. The pipeline instance identifier is stored at the frontend with the UX context and is used in subsequent calls during the processing workflow. The processing workflow is configured to make calls to an environment admin API to query for the global configuration from the database.

The consent data 213 from the consent data source 212 is mapped to a common data model at 232 and stored in a raw data default workspace 234 as raw mapped consent data 235. In some examples, the raw data default workspace 234 is part of the consent data storage 106 of FIG. 1. Additionally, or alternatively, the mapping 232 is performed during an FRE of an entity associated with the consent data source 212, such that the mapping established during the FRE is used when ingesting consent data 213 from the consent data source 212 at other times after the FRE (e.g., during an onboarding process of a new customer or otherwise a new data source as described herein).

In the mapping 232 stage, the user (e.g., the admin user of the entity of the data source) selects the data source 212 with their existing consent data 213. In some examples, a schema mapping tool (e.g., a power query (PQ) tool) is used to select data columns from the data source 212 and map those columns to the raw consent data schema of the raw data default workspace 234. An exemplary raw consent data schema is provided below in JavaScript Object Notation (JSON) format:

```
{
    "DataSubjectIDType" - Type of contact such as
    "Email" or "Phone" or "UserId".
    "DataSubjectID" - Email address, or Phone number, or
User ID.
    "Purpose" - The purpose for which the consent info
was acquired (not necessarily consented).
    "Country" - Country that the subject belongs to.
    "Consentstatus" - Data subject's consent (entity-
defined values) for the specific purpose.
    "ConsentDate" - Date the consent status was provided
by the DataSubject.
}
```

The above exemplary raw consent data schema includes a DataSubjectIDType that identifies the type of contact used with the subject, a DataSubjectID that identifies the actual identifier of the subject, a Purpose that identifies the purpose for which the consent was acquired, a Country that identifies the country of the subject, a ConsentStatus that identifies whether the subject consented for the specific purpose, and a ConsentDate that identifies when the consent data was provided by the subject.

After the consent data 213 is mapped to the raw mapped consent data 235 of the raw data default workspace 234 (e.g., in a raw consent data schema), the data is harmonized at 236 into standardized consent data 240 stored in the consent entity workspace 238. The data harmonization process 236 is described in greater detail below at least with respect to FIG. 3.

The standardized consent data 240 in the consent entity workspace 238 is used to identify consent data insights at 242. In some examples, the identified insights are used to generate subject rules and segments based on those insights. Such insights enable users of the pipeline system to define rules that efficiently handle consent queries for specific purposes and/or specific segments of the set of subjects.

Figure 3:
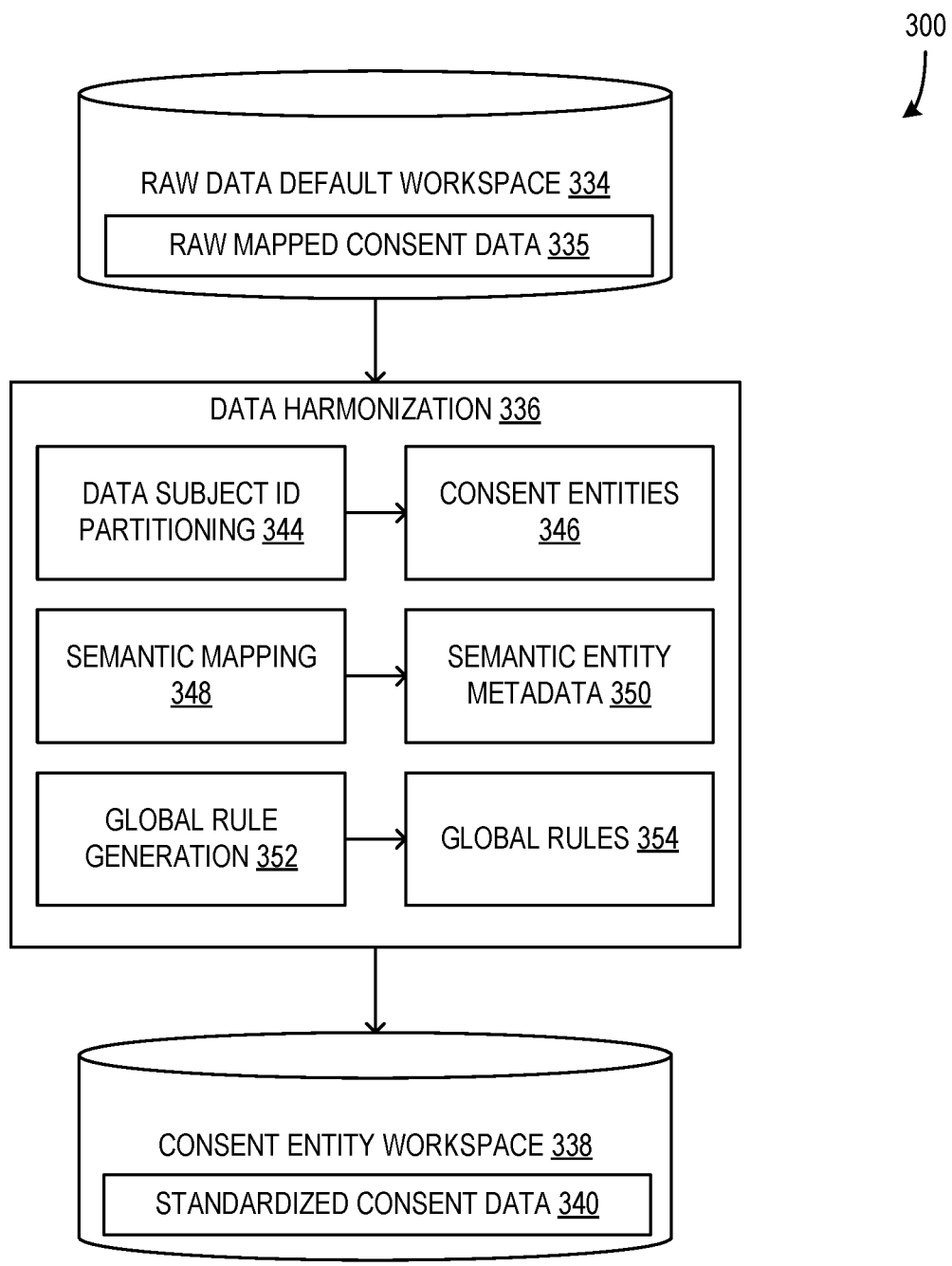
FIG. 3 is a block diagram illustrating a system process configured to harmonize consent data by generating semantic identities, semantic entity metadata, and global rules associated with those identities and entity metadata.

FIG. 3 is a block diagram illustrating a system process 300 configured to harmonize consent data 335 by generating consent identities 346, semantic entity metadata 350, and global rules 352 associated with those identities and entity metadata. In some examples, the process 300 is part of a process such as process 200 of FIG. 2 as described above. The data harmonization 336 is performed on the raw mapped consent data 335 of the raw data default workspace 334 to generate standardized consent data 340 in the consent entity workspace 338.

The raw mapped consent data 335 contains all the data use purpose data, the subject identifiers, and the corresponding consent status values. To enable the consent data to be used by applications as described herein, the raw mapped data is partitioned according to different types of subject ID at 344. For instance, if the consent data includes consent data instances that have been collected based on email addresses and consent data instances that have been collected based on telephone numbers, those different types of instances are partitioned into different groups. The result of such partitioning is the creation of consent entities 346. Semantic mapping at 348 is used to generate semantic entity metadata 350 associated with the semantic identities 350 and global rule generation is performed at 352 to generate global rules 354 associated with the semantic identities.

Exemplary types of data that are part of the pipeline are shown below. The model.json or other data structure generated as the output from the data postprocessing stage contains the following exemplary information. Raw consent data 335 is stored in a separate folder or other partition for each data source that provides data to the pipeline.

The raw consent data 335 is used to generate consent entity data 346 which includes a separate data file or structure for each data source and corresponding data subject ID type (e.g., all the email-based consent instances from a particular data source are stored together in a file).

Semantic entity metadata 350 is generated that includes metadata for each data use purpose, corresponding inclusionary nature (e.g., if the data use purpose is inclusionary, this is set to true, otherwise false), and the consent status values. An exemplary purpose metadata structure is provided below:

```
{
    "Purpose" : "Do not contact",
    "Inclusionary" : false,
    "Consentvalues" : ["yes", "OptedIn"]
}
```

This exemplary structure describes a semantic entity associated with the "Do not contact" purpose, which indicates a subject's consent whether they have requested to not be contacted by an entity. In this case, the "Inclusionary" metadata value is set to false, indicating that the purpose is not inclusionary. The "ConsentValues" of the semantic metadata include "yes" and "OptedIn". This indicates that the subject has selected affirmatively to be contacted further.

Additionally, or alternatively, semantic entity metadata 350 includes consent status value metadata structures and/or unique subscription metadata structures that are similar to the example purpose metadata structure provided above.

Further, in some examples, global rule generation at 352 include generation of global rules 354 as purpose filters that are applied for all segment creations that rely on the data of the consent entity workspace 338. For instance, in some examples that include the exemplary purpose metadata structure described above, a global rule is generated for the "Do not contact" purpose that is applied to all segments that are created from data of that data source. As a result, if the system includes a "Do not contact" consent entity of a subject that indicates the subject does not want to be contacted, the global rule is to not include that subject is applied when segments of subjects are generated from data of that data source. Rule creation is described in greater detail below with respect to FIGS. 4-10.

In some examples, the system process 300 include conflation and/or enrichment of consent data during the generation of the standardized consent data 340. Conflation refers to the ability to disambiguate the different records of consent coming in for the same data subject. For instance, if consent for a user identified by 'abc@xyz.com' is 'Ok to contact' in one system but 'Do not contact' in another, conflation is performed to determine a single consent entry for the user based on defined conflation rules or the like. Ultimately, the business application needs only one ultimate value of the consent that they can process. Enrichment of the consent data includes allowing the consent data to be enriched and/or complemented with other data attributes coming from a different source system.

An example data model for the different consent data entities that are involved in the consent management workflow is next provided.

TABLE 1

Purpose Consent Data Entity Schema.

| Name | Type |
|---|---|
| UniqueId | number |
| DataSubjectIdType | string |
| DataSubjectId | string |
| DataUsePurpose | string |
| Consentstatus | string |
| ConsentDate | DateTime |

TABLE 2

Subscription Consent Entity Schema.

| Name | Type |
|---|---|
| UniqueId | number |
| DataSubjectIdType | string |
| DataSubjectId | string |
| Subscription | string |
| SubscriptionStartDate | DateTime |
| SubscriptionEndDate | DateTime |
| Consentstatus | string |
| ConsentDate | DateTime |

TABLE 3

PurposeConsentSemanticMapping Entity Schema.

| Name | Type | Notes |
|---|---|---|
| Inclusive | Boolean | If the Purpose is inclusionary, this is set to True otherwise False |
| DataUsePurpose | string | |
| Consentstatuses | string | |

TABLE 4

PurposeConsentDefaultRuleMapping Entity Schema.

| Name | Type | Notes |
|---|---|---|
| RuleType | string | This is to indicate the type, such as "Segmentation" |
| DataUsePurpose | string | |

TABLE 5

SubscriptionConsentSemanticMapping Entity Schema.

| Name | Type | Notes |
|---|---|---|
| Inclusive | Boolean | If the Purpose is inclusionary, this is set to True otherwise False |
| Subscription | string | |
| Consentstatuses | string | |

TABLE 6

SubscriptionConsentDefaultRuleMapping Entity Schema.

| Name | Type | Notes |
|---|---|---|
| RuleType | string | The default rule is applied for this rule types (Segmentation, etc.) |
| Subscription | string | |

Figure 4:
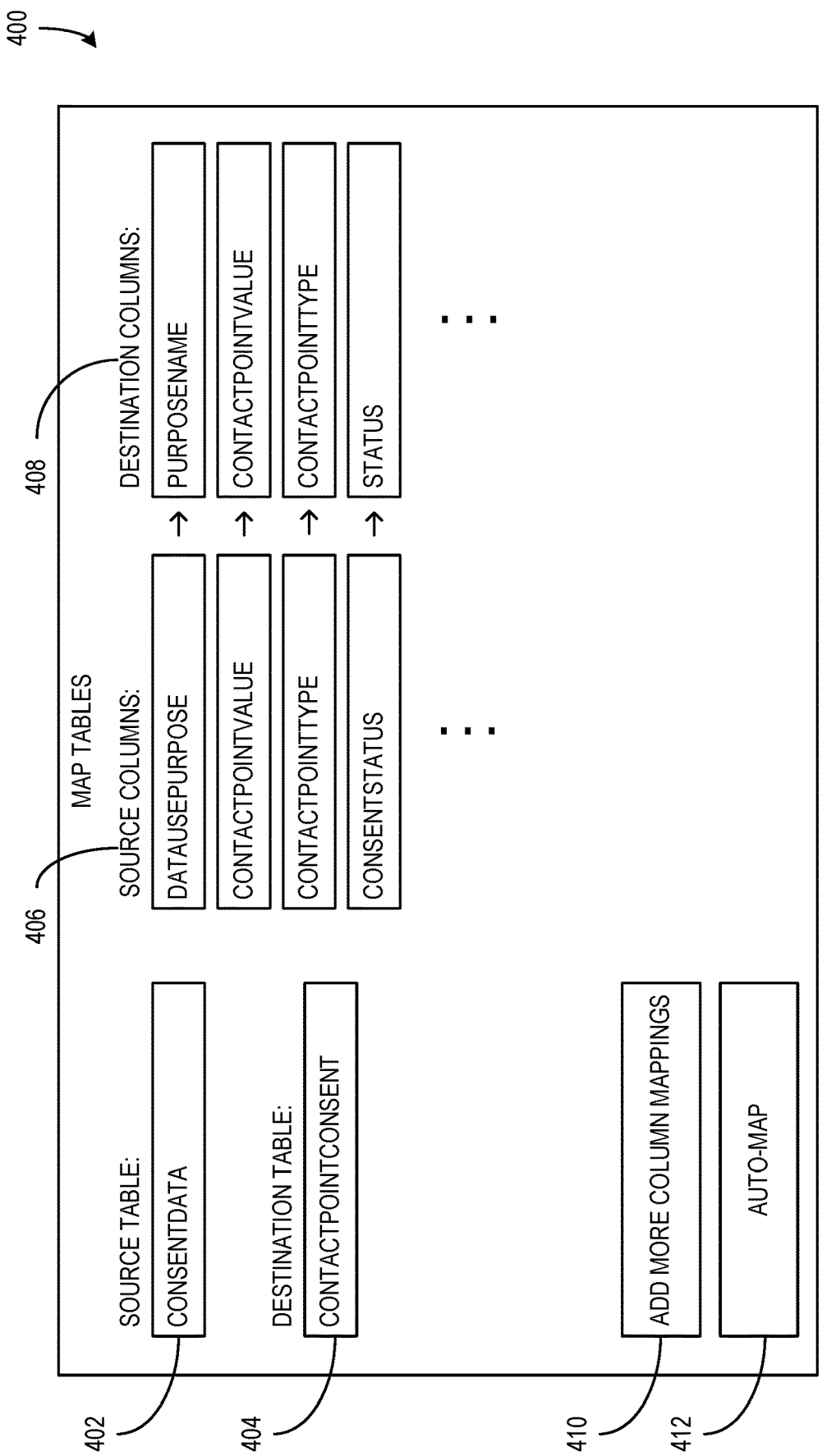
FIG. 4 is a diagram illustrating a user interface (UI) configured to map consent data from a data table of a data source to a data table of a consent data pipeline system.

FIG. 4 is a diagram illustrating a user interface (UI) 400 configured to map consent data from a data table of a data source to a data table of a consent data pipeline system (e.g., system 100 of FIG. 1). In some examples, the UI 400 is displayed or otherwise provided to a user during a FRE of the consent data pipeline system as described herein.

The UI 400 includes a source table section 402 and a destination table section 404. In some examples, the section 402 is editable by a user such that it can be populated with a name or other identifier of a data table of a consent data source (e.g., external consent data sources 112-114). As illustrated, the source table is named or identified as "ConsentData". Further, the section 404 is editable by a user such that it can be populated with a name or other identifier of a data table of the consent data pipeline system (e.g., a data table of the consent data storage 106).

In some examples, the UI 400 is configured to obtain and/or receive data from the consent data source and/or the consent data pipeline system that indicates possible source table identifiers and/or destination table identifiers. In such examples, this data is used to provide a list or group of table identifiers to select from (e.g., displayed in a menu or other UI component).

The UI 400 includes a source columns section 406 and a destination columns section 408. The source columns section 406 includes the names and/or identifiers of data columns of the source table identified in section 402. Those identified data columns of section 406 are mapped to the data columns identified in the destination columns section 408. For instance, as illustrated, the "DataUsePurpose" column of the source table is mapped to the "PurposeName" column of the destination table. In some examples, the sections 406 and 408 are configured to be editable by a user such that each entry box can be populated with data column identifiers by the user. The result of the sections 406 and 408 being populated is that the data columns of the section 406 are mapped to the corresponding data columns of the section 408 in the consent data pipeline system as described herein (e.g., at 232 of FIG. 2). Further, in some examples, more, fewer, or different data column identifiers are entered into the sections 406 and 408 without departing from the description.

The UI 400 includes an "Add More Column Mappings" button 410 and an "Auto-Map" button 412. In some examples, the button 410 is configured to increase the quantity of data column entry boxes in sections 406 and 408 upon activation. Further, in some examples, the button 412 is configured to automatically map data columns from the source table identified in section 402 to data columns from the destination table identified in section 404 upon activation. In such examples, the automatic mapping process is performed based on comparing the identifiers and/or data types of data columns of the source table and the destination table to each other. The process identifies the best fitting data columns of the destination table to the data columns of the source table, wherein a best fitting data column is a column that matches the data type of the source data column and that has a matching or similar column identifier. Additionally, or alternatively, if the automatic mapping process fails to identify a best fitting column for a source data column, the UI 400 is configured to notify a user that a column could not be found automatically and/or to prompt the user to manually select the destination data column and/or select that the associated data columns be left unmapped.

Figure 5:
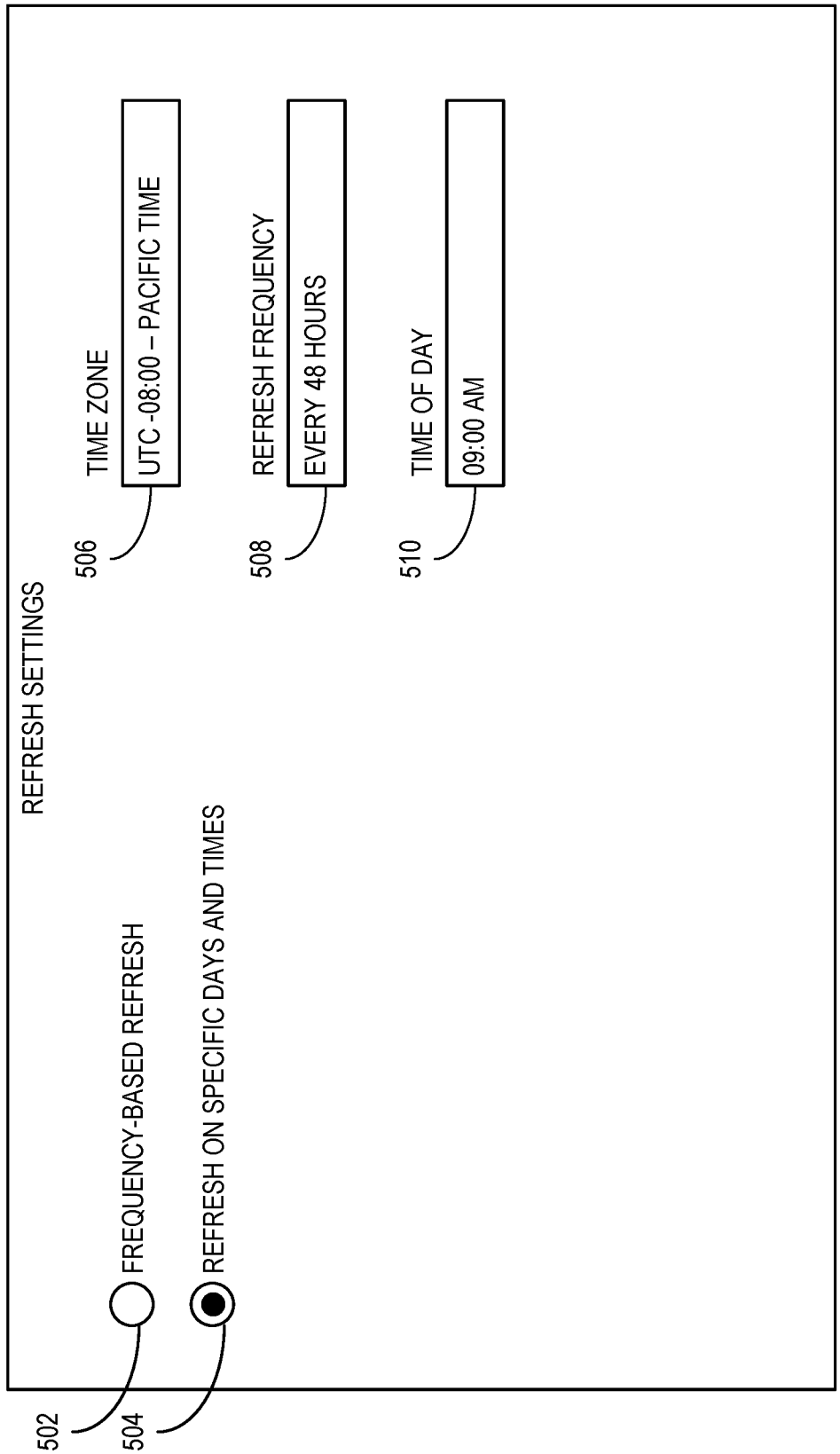
FIG. 5 is a diagram illustrating a UI configured to configure refresh settings of a consent data pipeline system.

FIG. 5 is a diagram illustrating a UI 500 configured to configure refresh settings of a consent data pipeline system (e.g., system 100 of FIG. 1). In some examples, the UI 500 is displayed or otherwise provided to a user as part of an FRE process as described herein.

The UI 500 includes a "frequency-based refresh" section 502 and a "refresh on specific days and times" section 504. The sections 502 and 504 are configured as being selectable via mutually exclusive radio buttons (e.g., if section 502 is selected, section 504 is not selected and vice versa). In some examples, selecting section 504 causes sections 506, 508, and 510 to be displayed. In other examples, selecting section 502 causes more, fewer, and/or different sections associated with frequency-based refreshing to be displayed without departing from the description.

The UI 500 includes the time zone section 506, the refresh frequency section 508, and the time-of-day section 510. The time zone section 506 enables a user to select a time zone upon which the refreshing of the consent data in the consent data pipeline system is based.

The refresh frequency section 508 enables a user to select a refresh frequency that determines how often the consent data in the consent data pipeline system is refreshed (e.g., the frequency with which new consent data is obtained from the external consent data sources). In examples where the section 502 radio button is selected, the refresh frequency section 508 or a similar section is displayed and/or used. In some examples, selecting the refresh frequency in section 508 includes selecting one frequency value from a list or set of possible frequency values. Alternatively, or additionally, the section 508 is configured to enable a user to select a time unit type (e.g., minutes, hours, days, or the like) and a value (e.g., '48' as illustrated).

The time-of-day section 510 enables a user to select a time of the day at which the refresh of the consent data pipeline occurs. In some examples, if the selected refresh frequency is more frequent than once a day, the time-of-day section 510 is configured to enable a user to select multiple times of day to fit the defined refresh frequency (e.g., if the refresh frequency is set to every six hours, the time of day section 510 includes four time of day entry boxes enabling the user to select four times that are six hours apart). Alternatively, or additionally, if the refresh frequency is set to a value that does not fit with a single time of day (e.g., a frequency of 36 hours), the time-of-day section 510 is disabled or otherwise not displayed.

Figure 6:
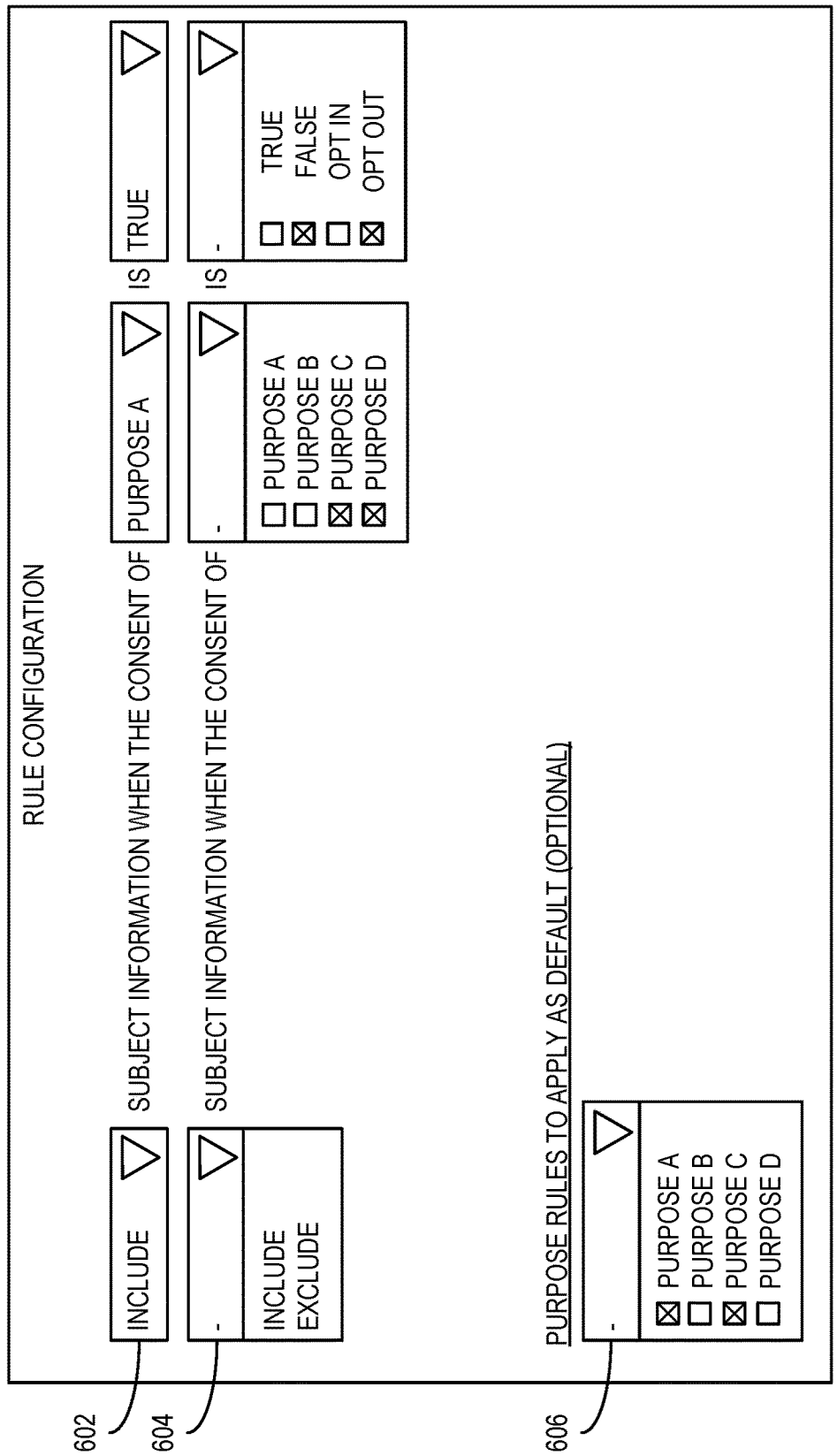
FIG. 6 is a diagram illustrating a UI configured to define rules associated with consent data of a consent data pipeline system.

FIG. 6 is a diagram illustrating a UI 600 configured to define rules associated with consent data of a consent data pipeline system (e.g., system 100 of FIG. 1). In some examples, the UI 600 is displayed or otherwise provided to a user as part of an FRE process as described herein.

The UI 600 includes rule definition sections 602 and 604. As illustrated, the definition of the rule displayed in section 602 is complete and the definition of the rule displayed in section 604 is in progress. The rule definition sections 602 and 604 include entry boxes that enable a user to select or otherwise enter specific data values used to define a rule. The first or farthest left entry box enables a user to define whether a rule is inclusive of subject information when the rule is satisfied or exclusive of subject information when the rule is satisfied. The rule of section 602 is inclusive, while this data value has not been defined for the rule of section 604. As illustrated, the entry box of section 604 includes a drop-down selection box that includes "include" and "exclude" options.

The sections 602 and 604 further include an entry box that enables a user to select one or more consent purposes that are to be used when evaluating the rule. As illustrated, Purpose A has been selected for the rule of section 602 and Purposes C and D are selected in a drop-down selection box. In some examples, rules that are defined with multiple purposes combine those purposes with the same semantics (e.g., including users when the value of the consent is "Opt In"). Such groupings of rules enable the rules to be defined more quickly and efficiently.

The sections 602 and 604 further include selection boxes enabling a user to select consent data values obtained from the raw consent data that are used to evaluate the rule. As illustrated, 'True' has been selected for the rule of section 602 and 'False' and 'OptOut' have both been selected in a drop-down selection box for the rule of section 604. The selected consent data values are used with the selected purposes to evaluate the defined rule (e.g., for the rule of section 602, a subject's information is included when the subject's consent data value associated with Purpose A is set to True).

Additionally, the UI 600 includes a section 606 configured to enable a user to define which rules are to be applied as default. As illustrated, a user is enabled to select default rules based on purposes with which those rules are associated. Purpose A and Purpose C are shown as being selected in the drop-down selection box of section 606, indicating that rules that are based on Purpose A and rules that are based on Purpose C are applied as default rules in the system. As a result, the rules of sections 602 and 604 will be applied as default rules as currently configured.

In other examples, more, fewer, or different rules are defined in the UI 600 without departing from the description.

In some purposes (e.g., "Do Not Contact") and the related consent values (e.g., "OptIn", "OptOut", "Yes", "No") are specific to the customer or other entity that is configuring the system for use. The UI 600 and other UIs described herein enable a user to specify such information based on structure and content of the consent data of their system. Further, in some examples, rules are defined with respect to subscriptions in a similar manner as rules defined for purposes as described above. For instance, rules are defined for subscriptions with respect to services or communications that a subject has subscribed to receive (e.g., a purpose of "send monthly newsletter" that a subject has consented to represents a subscription to the associated newsletter).

Figure 7:
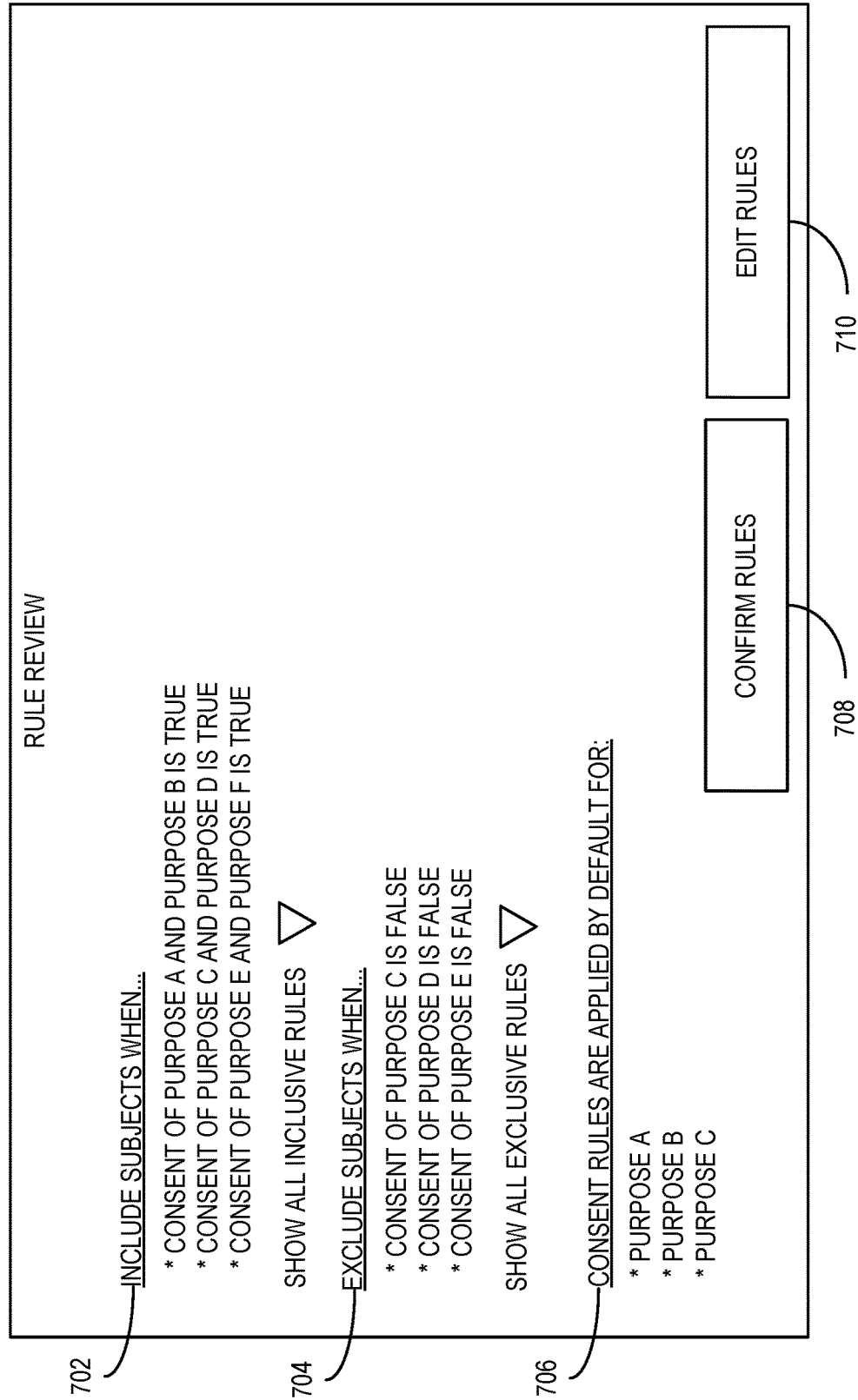
FIG. 7 is a diagram illustrating a UI configured to display a review of defined rules of a consent data pipeline system.

FIG. 7 is a diagram illustrating a UI 700 configured to display a review of defined rules of a consent data pipeline system (e.g., the system 100 of FIG. 1). In some examples, the UI 700 is displayed or otherwise provided when a rule definition process is completed using the UI 600 as described above.

The UI 700 includes a section 702 configured to display the currently defined inclusive rules. These are rules that have been defined to determine when a subject's information should be included in a query, segment, or the like based on that subject's consent data. The section 702 includes a list of multiple consent rules and an option to "show all inclusive rules" which can be used to expand the list to completely display all the defined inclusive rules. In some examples, an inclusive rule is a rule to include a subject's information when the subject has opted in to allow the system to use the subject's information for a purpose (e.g., using a customer's purchase information to curate recommendations for the customer).

The UI 700 includes a section 704 configured to display the currently defined exclusive rules. These are rules that have been defined to determine when a subject's information should not be included in a query, segment, or the like based on the subject's consent data. The section 704 includes a list of multiple consent rules and an option to "show all exclusive rules" which can be used to expand the list to completely display all the defined exclusive rules. In some examples, an exclusive rule is a rule to exclude a subject's information when the subject has not consented to or opted out of allowing the system to use the subject's information for a purpose (e.g., sharing a customer's purchase information with a third-party entity).

Further, the UI 700 includes a section 706 that displays a list of purposes for which the defined consent rules are applied by default. In some examples, this list of purposes reflects the purposes selected in section 606 of FIG. 6 as described herein.

Additionally, the UI 700 includes buttons 708 and 710. The button 708 is configured to enable a user to confirm the displayed rule configuration upon activation. The button 710 is configured to enable a user to edit the displayed rule configuration upon activation. In some examples, activating the button 710 causes the rule configuration UI 600 of FIG. 6 to be displayed, enabling the user to edit, add, and/or remove rules as described herein.

Figure 8:
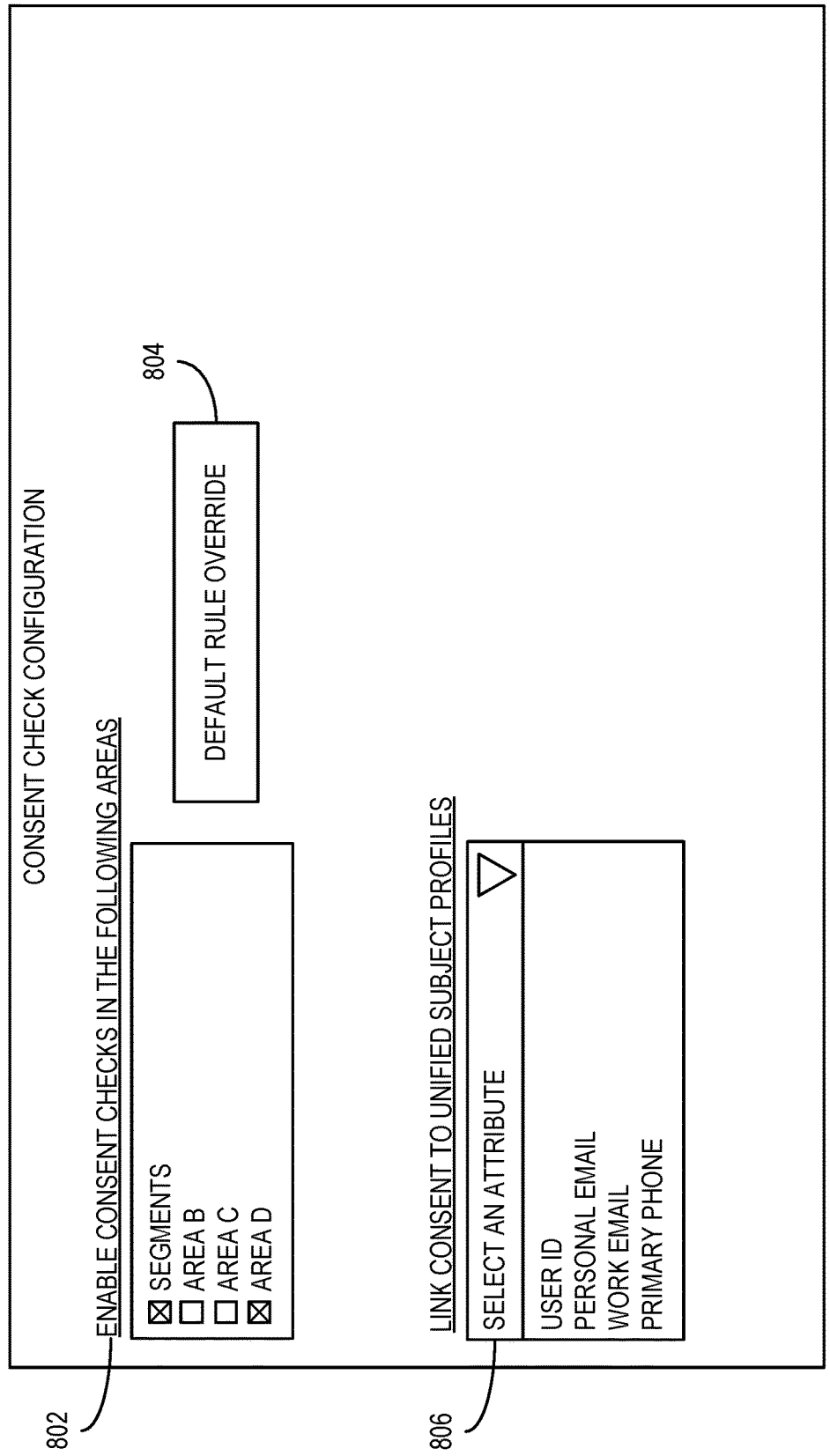
FIG. 8 is a diagram illustrating a UI configured to configure consent checking using a consent data pipeline system.

FIG. 8 is a diagram illustrating a UI 800 configured to configure consent checking using a consent data pipeline system (e.g., the system 100 of FIG. 1). In some examples, the UI 500 is displayed or otherwise provided to a user as part of an FRE process as described herein.

The UI 800 includes a section 802 configured to display applications, uses, and/or areas where consent checks may be applied (e.g., based on consent rules configured as described above). The section 802 further enables a user to select which displayed areas have consent checks enabled (e.g., via a checkbox next to the area as illustrated). In other examples, more, fewer, and/or different areas are displayed without departing from the description.

The section 802 includes a 'segments' entry that is selected, such that consent checks are applied when a set of subjects are being divided into segments for various purposes. Thus, the defined consent rules are applied to segmentation of a set of subjects automatically using the described system. An application that is connected to the consent data pipeline system is enabled to generate segments of subjects that have automatically been checked for consent for the purpose(s) of that application. Further, in some examples, the areas of section 802 include at least one of the following: Export Destinations or Activations, Measures, and AI/Machine Learning Models.

In some examples, another area where consent checking operations are used is in the training and testing of AI models using machine learning techniques. The processed consent data of the described system is used to generate or otherwise segment data to be used as training data during model training. Additionally, or alternatively, the training process trains a model to use portions of the processed consent data in its operations (e.g., a model that is trained to classify subjects based at least partially on the subjects' consent to a particular purpose).

The UI 800 further includes a button 804 that is configured to enable a user to override the default rules as configured upon activation. In some examples, the button 804 causes a UI to be displayed that enables the user to choose areas in which the default rules are overridden. Additionally, or alternatively, this UI enables the user to choose which default rules are overridden and/or to choose other rules to be applied in place of the overridden rules.

Additionally, the UI 800 includes a section 806 configured to enable a user to link the consent data of the system to subject profiles. As illustrated, the section 806 includes a drop-down selection box with multiple different subject identifier data types that can be selected as the link between the consent data of the system and subject profiles that are used for other reasons. In some examples, the link data value defined using the section 806 is used during the evaluation of rules when performing consent checks. For instance, in an example, an application is connected to the consent data pipeline system and that application uses a work email address as the identifier for subjects within the application. The section 806 enables a user to configure the work email data value as the link to subjects' information within the consent data pipeline system, ensuring consistent identification of subjects across the application and the pipeline system.

Figure 9:
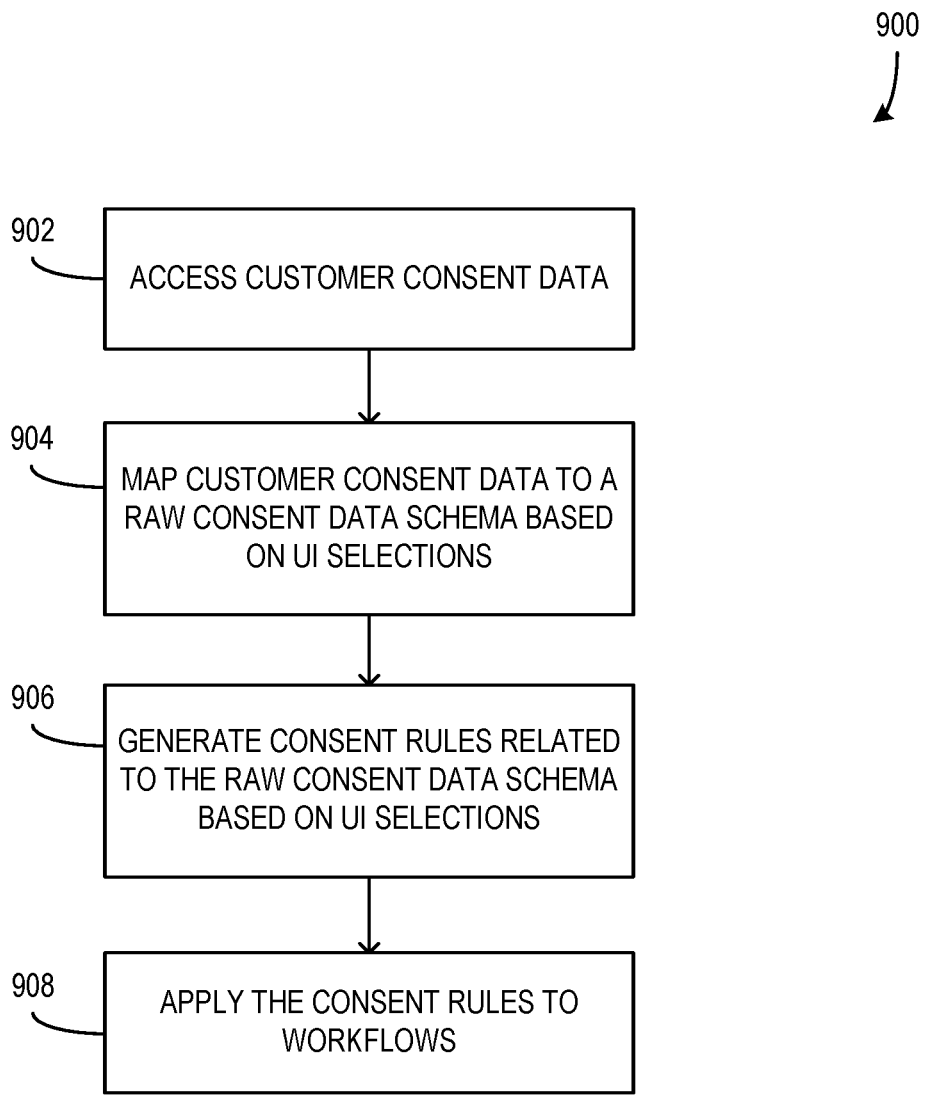
FIG. 9 is a flowchart illustrating a computerized method for processing consent data and applying the processed consent data to workflows.

FIG. 9 is a flowchart illustrating a computerized method 900 for processing consent data and applying the processed consent data to workflows. In some examples, the method 900 is executed or otherwise performed in, or in association with, a system such as system 100 of FIG. 1. At 902, customer consent data is accessed, wherein the customer consent data includes subject consent instances (e.g., a data set associated with a single consent response by a subject) including associated consent purpose-value pairs (e.g., a consent purpose, such as "Do not contact", paired with the consent status value of the subject's response, such as "True" or "OptOut").

At 904, the customer consent data is mapped to a raw consent data schema based on mapping selections made on a mapping UI (e.g., UI 400 of FIG. 4), wherein the mapping includes mapping consent purpose-value pairs of the consent instances to data columns of the raw consent data schema.

Further, in some examples, the method 900 includes determining semantic metadata of consent purpose-value pairs of the mapped customer consent data in the raw consent data schema, wherein the determined semantic metadata indicates that subject information should be included based on a consent purpose-value pair or that subject information should be excluded based on a consent purpose-value pair. For instance, in an example with a consent purpose-value pair indicating a consent purpose of "send weekly newsletter" and a consent value of "OptIn", semantic metadata is determined including an inclusive value of "True", indicating that the consent purpose-value pair is associated with the subject information being included rather than excluded.

Additionally, or alternatively, in such examples, the generation of the consent rules is based on the determined semantic metadata (e.g., determining the inclusive or exclusive attributes of the generated rules is based on the determined semantic metadata, such that rules that are based on a consent purpose-value pair have the same inclusive value as the determined semantic metadata of that consent purpose-value pair).

Further, in some examples, mapping the customer consent data to a raw consent data schema based on mapping selections made on a mapping UI includes: receiving, on the mapping UI, a source table selection indicative of a first data table of the accessed customer consent data (e.g., the selection in section 402 of FIG. 4); receiving, on the mapping UI, a destination table selection indicative of a second data table associated with the raw consent data schema (e.g., the selection in section 404 of FIG. 4); receiving, on the mapping UI, one or more source column selections indicative of data columns in the first data table of the accessed customer consent data (e.g., the selections in section 406 of FIG. 4); and receiving, on the mapping UI, one or more destination column selections indicative of data columns in the second data table associated with the raw consent data schema (e.g., the selections in section 408 of FIG. 4), wherein each destination column selection of the one or more destination column selections corresponds to a source column selection of the one or more source column selections. The columns of the first data table are then mapped to columns of the second data table based on the source table selection, the destination table selection, the one or more source column selections, and the one or more destination column selections.

At 906, metadata is generated that represents one or more consent rules related to the raw consent data schema based on rule selections made on a rule configuration UI (e.g., UI 600 of FIG. 6). In some examples, the rule selections include a first selection to include subject information when the consent rule is satisfied or to exclude subject information when the consent rule is satisfied; a second selection of one or more consent purposes to evaluate during evaluation of the consent rule; and a third selection of one or more consent values of the one or more consent purposes that indicate the consent rule is satisfied during evaluation of the consent rule (e.g., the selections in section 602 and/or section 604 of FIG. 6).

Additionally, or alternatively, generating the one or more consent rules further includes assigning at least one consent rule of the one or more consent rules as a default consent rule to be applied to all the one or more workflows (e.g., the selection in section 606 of FIG. 6). For instance, in an example, a rule associated with the purpose "Do not contact" is assigned as a default rule such that all workflows honor the rule to exclude subjects that do not want to be contacted from operations that involve contacting subjects.

At 908, the consent rules are applied to one or more workflows (e.g., workflows associated with applications such as applications 110 of FIG. 1).

Further, in some examples, the method 900 includes linking a subject identifier type of the accessed customer consent data to the one or more workflows based on a subject identifier type selection made on a link UI (e.g., the section 806 of FIG. 8). Such a link enables the consent rule to be applied to the one or more workflows based on that linked subject identifier type. For example, while the described system may include consent data of a subject linked to multiple different subject identifier types, if a workflow uses a particular subject identifier type, that type is linked to the workflow in the consent system such that consent operations requested by the workflow prioritize or otherwise use the consent data associated with the linked subject identifier type before other consent data.

Additionally, or alternatively, the method 900 further includes configuring a refresh interval associated with the accessed customer consent data based on refresh configuration selections made on a data refresh UI (e.g., selections on UI 500 of FIG. 5). In some examples, the method 900 includes accessing customer consent data periodically based on the configured refresh interval as described herein.

Example Use Cases

Company A wants to comply with detailed consent permission regulations such as GDPR without unnecessarily sacrificing fidelity of insights and accurate and agile segmentation. The data ingestion pipeline described herein is used to on-board, aggregate, and unify customer consent data from several sources based on preset rules. The consent data are stored in a canonical data model with rich consent semantics that flow through downstream processes alongside their associated profiles.

Taking advantage of the GDPR requirements such as right to withdraw consent, 10% of Company A's users elected to not share their data with third parties. This is not a full opt-out, so using the consent enforcement capabilities provided by the described system, Company A configures policies for their measurements (e.g., for analytics) to include those users, thus retaining fidelity.

Company A is segmenting its users. Those segments are sent to an activation service for email campaigns (e.g., first party (1P) data processing) and to social media companies (e.g., third party (3P) data processing). Company A configures the social media export to be a 3P export, so users that opted out of sharing will not have their info sent. However, the email campaign export is marked as 1P and will still include info from those users. This also improves segmentation size metrics over time and minimizes how consent changes could skew overall measurements which are important for marketing campaigns and marketing analytics.

Company A can also create a segment of only those users that have not completely opted out but have updated consent permissions restricting certain sharing or companies. Company A identifies these users as "high-sensitivity" and want to treat them more carefully in personalized engagements. Specific customer journeys for this segment are configured to send less personalized communications to them with specific messaging. Using the scalable consent check API from the system described herein, Company A can run a just in time (e.g., last mile check) consent check to ensure adherence to user communication preferences.

Exemplary Operating Environment

Figure 10:
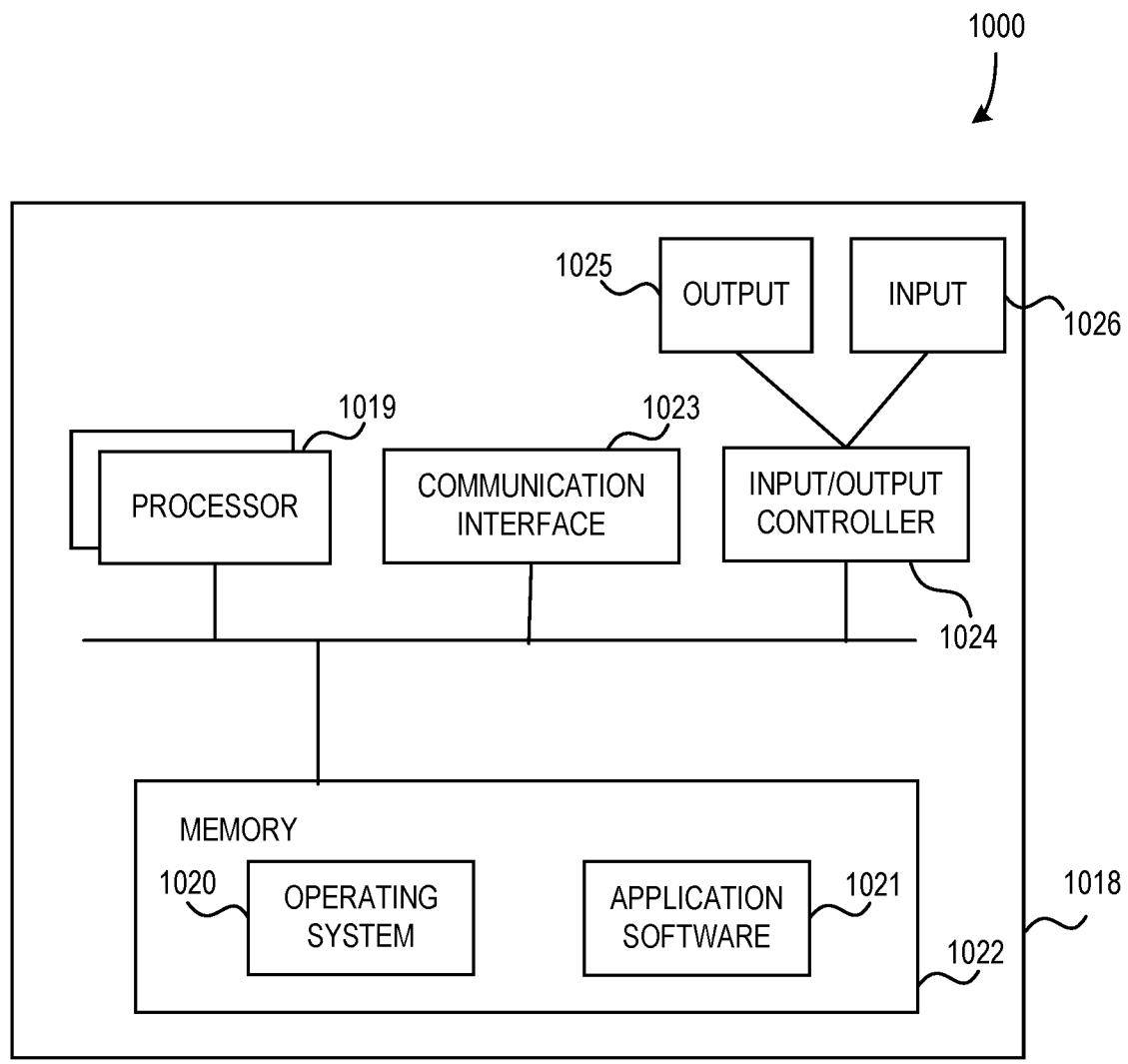
FIG. 10 illustrates an example computing apparatus as a functional block diagram.

The present disclosure is operable with a computing apparatus according to an embodiment as a functional block diagram 1000 in FIG. 10. In an example, components of a computing apparatus 1018 are implemented as a part of an electronic device according to one or more embodiments described in this specification. The computing apparatus 1018 comprises one or more processors 1019 which may be microprocessors, controllers, or any other suitable type of processors for processing computer executable instructions to control the operation of the electronic device. Alternatively, or in addition, the processor 1019 is any technology capable of executing logic or instructions, such as a hard-coded machine. In some examples, platform software comprising an operating system 1020 or any other suitable platform software is provided on the apparatus 1018 to enable application software 1021 to be executed on the device. In some examples, processing and manage consent data as described herein is accomplished by software, hardware, and/or firmware.

In some examples, computer executable instructions are provided using any computer-readable media that are accessible by the computing apparatus 1018. Computer-readable media include, for example, computer storage media such as a memory 1022 and communications media. Computer storage media, such as a memory 1022, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1022) is shown within the computing apparatus 1018, it will be appreciated by a person skilled in the art, that, in some examples, the storage is distributed or located remotely and accessed via a network or other communication link (e.g., using a communication interface 1023).

Further, in some examples, the computing apparatus 1018 comprises an input/output controller 1024 configured to output information to one or more output devices 1025, for example a display or a speaker, which are separate from or integral to the electronic device. Additionally, or alternatively, the input/output controller 1024 is configured to receive and process an input from one or more input devices 1026, for example, a keyboard, a microphone, or a touchpad. In one example, the output device 1025 also acts as the input device. An example of such a device is a touch sensitive display. The input/output controller 1024 may also output data to devices other than the output device, e.g., a locally connected printing device. In some examples, a user provides input to the input device(s) 1026 and/or receive output from the output device(s) 1025.

The functionality described herein can be performed, at least in part, by one or more hardware logic components. According to an embodiment, the computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An exemplary system comprises at least one processor; and at least one memory comprising computer program code, the at least one memory and the computer program code configured to, with the at least one processor, cause the at least one processor to: access customer consent data, wherein the customer consent data includes subject consent instances including associated consent purpose-value pairs;

map the customer consent data to a raw consent data schema based on mapping selections made on a mapping UI, wherein the mapping includes mapping consent purpose-value pairs of the consent instances to data columns of the raw consent data schema; generate metadata representing one or more consent rules related to the raw consent data schema based on rule selections made on a rule configuration UI; and apply the consent rules to one or more workflows.

An exemplary computerized method comprises accessing, by a processor, customer consent data, wherein the customer consent data includes subject consent instances including associated consent purpose-value pairs; mapping, by the processor, the customer consent data to a raw consent data schema based on mapping selections made on a mapping UI, wherein the mapping includes mapping consent purpose-value pairs of the consent instances to data columns of the raw consent data schema; generating, by the processor, metadata representing one or more consent rules related to the raw consent data schema based on rule selections made on a rule configuration UI; and applying, by the processor, the consent rules to one or more workflows.

One or more computer storage media have computer-executable instructions that, upon execution by a processor, cause the processor to at least: access customer consent data, wherein the customer consent data includes subject consent instances including associated consent purpose-value pairs; map the customer consent data to a raw consent data schema based on mapping selections made on a mapping UI, wherein the mapping includes mapping consent purpose-value pairs of the consent instances to data columns of the raw consent data schema; generate metadata representing one or more consent rules related to the raw consent data schema based on rule selections made on a rule configuration UI; and apply the consent rules to one or more workflows.

Alternatively, or in addition to the other examples described herein, examples include any combination of the following:
- further comprising: determining semantic metadata of consent purpose-value pairs of the mapped customer consent data in the raw consent data schema, wherein the determined semantic metadata indicates that subject information should be included based on a consent purpose-value pair or that subject information should be excluded based on a consent purpose-value pair; and wherein generating metadata representing the one or more consent rules is further based on the determined semantic metadata.
- wherein mapping the customer consent data to a raw consent data schema based on mapping selections made on a mapping UI includes: receiving, on the mapping UI, a source table selection indicative of a first data table of the accessed customer consent data; receiving, on the mapping UI, a destination table selection indicative of a second data table associated with the raw consent data schema; receiving, on the mapping UI, one or more source column selections indicative of data columns in the first data table of the accessed customer consent data; receiving, on the mapping UI, one or more destination column selections indicative of data columns in the second data table associated with the raw consent data schema, wherein each destination column selection of the one or more destination column selections corresponds to a source column selection of the one or more source column selections; and mapping columns of the first data table to columns of the second data table based on the source table selection, the destination table selection, the one or more source column selections, and the one or more destination column selections.
- wherein rule selections made on the rule configuration UI to generate a consent rule of the one or more consent rules include: a first selection to include subject information when the consent rule is satisfied or to exclude subject information when the consent rule is satisfied; a second selection of one or more consent purposes to evaluate during evaluation of the consent rule; and a third selection of one or more consent values of the one or more consent purposes that indicate the consent rule is satisfied during evaluation of the consent rule.
- further comprising linking a subject identifier type of the accessed customer consent data to the one or more workflows based on a subject identifier type selection made on a link UI, whereby applying the consent rules to the one or more workflows is based on the linked subject identifier type.
- wherein generate metadata representing one or more consent rules includes assigning at least one consent rule of the one or more consent rules as a default consent rule to be applied to all the one or more workflows.
- further comprising: configuring a data refresh interval associated with the accessed customer consent data based on refresh configuration selections made on a data refresh UI, wherein the customer consent data is accessed periodically based on the configured data refresh interval.

Any range or device value given herein may be extended or altered without losing the effect sought, as will be apparent to the skilled person.

While no personally identifiable information is believed to be tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for accessing, by a processor, customer consent data, wherein the customer consent data includes subject consent instances including associated consent purpose-value pairs; exemplary means for mapping, by the processor, the customer consent data to a raw consent data schema based on mapping selections made on a mapping UI, wherein the mapping includes mapping consent purpose-value pairs of the consent instances to data columns of the raw consent data schema; exemplary means for generating, by the processor, metadata representing one or more consent rules related to the raw consent data schema based on rule selections made on a rule configuration UI; and exemplary means for applying, by the processor, the consent rules to one or more workflows.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a memory comprising computer program code, the memory and the computer program code configured to, with the processor, cause the processor to:
access customer consent data, wherein the customer consent data includes subject consent instances including associated consent purpose-value pairs;
map the customer consent data to a raw consent data schema based on a mapping selection made on a mapping user interface (UI), wherein the mapping includes mapping consent purpose-value pairs of the consent instances to data columns of the raw consent data schema, resulting in raw mapped customer consent data;
harmonize the raw mapped customer consent data into standardized consent data;
store the standardized consent data in a consent entity workspace;
generate metadata representing a consent rule related to the raw consent data schema based on a rule selection made on a rule configuration UI; and
apply the consent rule to a workflow.

2. The system of claim 1, wherein the memory and the computer program code is configured to, with the processor, further cause the processor to:
determine semantic metadata of consent purpose-value pairs of the mapped customer consent data in the raw consent data schema, wherein the determined semantic metadata indicates that subject information should be included based on a consent purpose-value pair or that subject information should be excluded based on a consent purpose-value pair; and
wherein generating metadata representing the consent rule is further based on the determined semantic metadata.

3. The system of claim 1, wherein mapping the customer consent data to a raw consent data schema based on a mapping selection made on a mapping UI includes:
receiving, on the mapping UI, a source table selection indicative of a first data table of the accessed customer consent data;
receiving, on the mapping UI, a destination table selection indicative of a second data table associated with the raw consent data schema;
receiving, on the mapping UI, a source column selection indicative of data columns in the first data table of the accessed customer consent data;
receiving, on the mapping UI, a destination column selection indicative of data columns in the second data table associated with the raw consent data schema, wherein each destination column selection corresponds to a source column selection; and
mapping columns of the first data table to columns of the second data table based on the source table selection, the destination table selection, the source column selection, and the destination column selection.

4. The system of claim 1, wherein the rule selection made on the rule configuration UI to generate a consent rule of the consent rule includes:
a first selection to include subject information when the consent rule is satisfied or to exclude subject information when the consent rule is satisfied;
a second selection of a consent purpose to evaluate during evaluation of the consent rule; and
a third selection of a consent value of the consent purpose that indicate the consent rule is satisfied during evaluation of the consent rule.

5. The system of claim 1, wherein the memory and the computer program code is configured to, with the processor, further cause the processor to:
link a subject identifier type of the accessed customer consent data to the workflow based on a subject identifier type selection made on a link UI, whereby applying the consent rule to the workflow is based on the linked subject identifier type.

6. The system of claim 1, wherein generating metadata representing a consent rule includes assigning a consent rule as a default consent rule to be applied to each the workflow.

7. The system of claim 1, wherein the memory and the computer program code is configured to, with the processor, further cause the processor to:
configure a data refresh interval associated with the accessed customer consent data based on a refresh configuration selection made on a data refresh UI, wherein the customer consent data is accessed periodically based on the configured data refresh interval.

8. A computerized method comprising:
accessing, by a processor, customer consent data, wherein the customer consent data includes subject consent instances including associated consent purpose-value pairs;
mapping, by the processor, the customer consent data to a raw consent data schema based on a mapping selection made on a mapping user interface (UI), wherein the mapping includes mapping consent purpose-value pairs of the consent instances to data columns of the raw consent data schema, resulting in raw mapped customer consent data;
harmonizing the raw mapped customer consent data into standardized consent data;
storing the standardized consent data in a consent entity workspace;
generating, by the processor, metadata representing a consent rule related to the raw consent data schema based on a rule selection made on a rule configuration UI; and
applying, by the processor, the consent rule to a workflow.

9. The computerized method of claim 8, further comprising:
determining semantic metadata of consent purpose-value pairs of the mapped customer consent data in the raw consent data schema, wherein the determined semantic metadata indicates that subject information should be included based on a consent purpose-value pair or that subject information should be excluded based on a consent purpose-value pair; and
wherein generating metadata representing the consent rule is further based on the determined semantic metadata.

10. The computerized method of claim 8, wherein mapping the customer consent data to a raw consent data schema based on a mapping selection made on a mapping UI includes:
receiving, on the mapping UI, a source table selection indicative of a first data table of the accessed customer consent data;
receiving, on the mapping UI, a destination table selection indicative of a second data table associated with the raw consent data schema;
receiving, on the mapping UI, a source column selection indicative of data columns in the first data table of the accessed customer consent data;
receiving, on the mapping UI, a destination column selection indicative of data columns in the second data table associated with the raw consent data schema, wherein each destination column selection corresponds to a source column selection; and
mapping columns of the first data table to columns of the second data table based on the source table selection, the destination table selection, the source column selection, and the destination column selection.

11. The computerized method of claim 8, wherein a rule selection made on the rule configuration UI to generate a consent rule include:
a first selection to include subject information when the consent rule is satisfied or to exclude subject information when the consent rule is satisfied;
a second selection of a consent purpose to evaluate during evaluation of the consent rule; and a third selection of a consent value of the consent purpose that indicate the consent rule is satisfied during evaluation of the consent rule.

12. The computerized method of claim 8, further comprising
linking a subject identifier type of the accessed customer consent data to the workflow based on a subject identifier type selection made on a link UI, whereby applying the consent rule to the workflow is based on the linked subject identifier type.

13. The computerized method of claim 8, wherein generating metadata representing a consent rule includes assigning a consent rule as a default consent rule to be applied to each the workflow.

14. The computerized method of claim 8, further comprising:
configuring a data refresh interval associated with the accessed customer consent data based on a refresh configuration selection made on a data refresh UI, wherein the customer consent data is accessed periodically based on the configured data refresh interval.

15. A computer storage medium having computer-executable instructions that, upon execution by a processor, cause the processor to at least:
access customer consent data, wherein the customer consent data includes subject consent instances including associated consent purpose-value pairs;
map the customer consent data to a raw consent data schema based on a mapping selection made on a mapping user interface (UI), wherein the mapping includes mapping consent purpose-value pairs of the consent instances to data columns of the raw consent data schema, resulting in raw mapped customer consent data;
harmonize the raw mapped customer consent data into standardized consent data;
store the standardized consent data in a consent entity workspace;
generate metadata representing a consent rule related to the raw consent data schema based on a rule selection made on a rule configuration UI; and
apply the consent rule to a workflow.

16. The computer storage medium of claim 15, wherein the computer-executable instructions, upon execution by a processor, further cause the processor to at least:
determine semantic metadata of consent purpose-value pairs of the mapped customer consent data in the raw consent data schema, wherein the determined semantic metadata indicates that subject information should be included based on a consent purpose-value pair or that subject information should be excluded based on a consent purpose-value pair; and
wherein generating metadata representing the consent rule is further based on the determined semantic metadata.

17. The computer storage medium of claim 15, wherein mapping the customer consent data to a raw consent data schema based on a mapping selection made on a mapping UI includes:
receiving, on the mapping UI, a source table selection indicative of a first data table of the accessed customer consent data;
receiving, on the mapping UI, a destination table selection indicative of a second data table associated with the raw consent data schema;

receiving, on the mapping UI, source column selection indicative of data columns in the first data table of the accessed customer consent data;

receiving, on the mapping UI, destination column selection indicative of data columns in the second data table associated with the raw consent data schema, wherein each destination column selection corresponds to a source column selection; and mapping columns of the first data table to columns of the second data table based on the source table selection, the destination table selection, the source column selection, and the destination column selection.

18. The computer storage medium of claim 15, wherein a rule selection made on the rule configuration UI to generate a consent rule include:

a first selection to include subject information when the consent rule is satisfied or to exclude subject information when the consent rule is satisfied;

a second selection of a consent purpose to evaluate during evaluation of the consent rule; and a third selection of consent value of the consent purpose that indicate the consent rule is satisfied during evaluation of the consent rule.

19. The computer storage medium of claim 15, wherein the computer-executable instructions, upon execution by a processor, further cause the processor to at least:

link a subject identifier type of the accessed customer consent data to the workflow based on a subject identifier type selection made on a link UI, whereby applying the consent rule to the workflow is based on the linked subject identifier type.

20. The computer storage medium of claim 15, wherein generating the metadata representing a consent rule includes assigning a consent rule as a default consent rule to be applied to each the workflow.

* * * * *